US012445847B2

(12) United States Patent
Kweon (10) Patent No.: US 12,445,847 B2
(45) Date of Patent: Oct. 14, 2025

(54) METHOD AND APPARATUS FOR UE AUTHENTICATION FOR REMOTE PROVISIONING

(71) Applicant: Samsung Electronics Co., Ltd., Gyeonggi-do (KR)

(72) Inventor: Kisuk Kweon, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 368 days.

(21) Appl. No.: 17/987,558

(22) Filed: Nov. 15, 2022

(65) Prior Publication Data

US 2023/0156470 A1 May 18, 2023

(30) Foreign Application Priority Data

Nov. 16, 2021 (KR) .................. 10-2021-0157875

(51) Int. Cl.
*H04W 12/08* (2021.01)
*H04W 8/18* (2009.01)
(Continued)

(52) U.S. Cl.
CPC ............. *H04W 12/08* (2013.01); *H04W 8/18* (2013.01); *H04W 12/06* (2013.01); *H04W 12/72* (2021.01); *H04W 60/00* (2013.01)

(58) Field of Classification Search
CPC .......................... H04L 63/0869; H04W 12/06; H04W 12/069; H04W 12/08; H04W 12/35;
(Continued)

(56) References Cited

U.S. PATENT DOCUMENTS 11,848,909 B2 * 12/2023 Korja .................. H04L 63/0281
12,015,917 B2 * 6/2024 Gundavelli ............. H04L 63/08
(Continued)

FOREIGN PATENT DOCUMENTS

WO WO 2023/058974 4/2023

OTHER PUBLICATIONS

Ericsson et al., "Rapporteur's Editorial Cleanup for eNPN", S2-2108465, 3GPP TSG-WG SA 2 Meeting #148E, Nov. 15-22, 2021, 11 pages.
(Continued)

*Primary Examiner* — Khawar Iqbal
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for Internet of Things (IoT). A method is provided for operating a terminal in a wireless network, including configuring a restricted packet data unit session with a provisioning server (PVS); transmitting a remote provisioning request message including a subscription permanent identifier to the PVS; and receiving a remote provisioning response message in response to the remote provisioning request message. The remote provisioning response message includes standalone non-public network credentials and subscription data of a terminal in case that a remote provisioning for the terminal is approved.

8 Claims, 6 Drawing Sheets

(51) Int. Cl.
*H04W 12/06* (2021.01)
*H04W 12/72* (2021.01)
*H04W 60/00* (2009.01)

(58) Field of Classification Search
CPC ....... H04W 12/72; H04W 8/18; H04W 84/10; H04W 60/00
See application file for complete search history.

(56) References Cited

U.S. PATENT DOCUMENTS

| | | | |
|---|---|---|---|
| 2021/0058784 A1* | 2/2021 | Kedalagudde | H04W 76/12 |
| 2021/0105712 A1 | 4/2021 | Speicher et al. | |
| 2022/0330022 A1* | 10/2022 | Kolekar | H04W 12/069 |
| 2022/0360493 A1* | 11/2022 | Sung | H04W 76/11 |
| 2023/0087052 A1* | 3/2023 | Korja | H04L 63/0263 |
| | | | 709/245 |
| 2023/0137814 A1* | 5/2023 | Staufer | H04W 12/06 |
| | | | 455/411 |
| 2023/0199484 A1* | 6/2023 | Kweon | H04W 8/18 |
| | | | 380/270 |
| 2023/0199632 A1* | 6/2023 | Talebi | H04W 48/16 |
| | | | 455/434 |
| 2024/0073691 A1* | 2/2024 | Lehtovirta | H04W 12/106 |
| 2024/0292219 A1* | 8/2024 | Kim | H04W 12/35 |
| 2024/0314560 A1* | 9/2024 | Gundavelli | H04W 12/06 |
| 2024/0314720 A1* | 9/2024 | Sethi | H04W 8/205 |

OTHER PUBLICATIONS

3GPP TS 33.501 V17.3.0, 3GPP, 3rd Generation Partnership Project; Technical Specification Group Services and System Aspects; Security Architecture and Procedures for 5G System (Release 17), Sep. 2021, 258 pages.
ZTE, Ericsson, "Clarification on the UE Remote Provisioning", S2-2108105, SA WG2 Meeting #S2-147E, Oct. 18-22, 2021, 4 pages.
Huawei, HiSilicon, "23.501 Proposal in Case DCS Provide the PVS Address", S2-2106243, 3GPP TSG-WG SA2 Meeting #146E, Aug. 16-27, 2021, 4 pages.
Ericsson, Nokia, Nokia Shanghai Bell, "Registration Procedure for Onboarding SNPN", S2-2106721, 3GPP TSG-SA WG2 Meeting #146E, Aug. 16-27, 2021, 4 pages.
International Search Report dated Jan. 31, 2023 issued in counterpart application No. PCT/KR2022/018006, 7 pages.
Ericsson et al., "UE Boarding", S2-2104217, 3GPP TSG-WG SA2 Meeting #145E e-meeting, May 17-28, 2021, 14 pages.
Huawei et al., "KI#4, Evaluations and Conclusions Update", S2-2007048, 3GPP TSG-WG SA2 Meeting #141E e-meeting, Oct. 12-23, 2020, 9 pages.
European Search Report dated Nov. 19, 2024 issued in counterpart application No. 22896026.6-1215, 16 pages.

* cited by examiner

METHOD AND APPARATUS FOR UE AUTHENTICATION FOR REMOTE PROVISIONING

CROSS-REFERENCE TO RELATED APPLICATION(S)

This application is based on and claims priority under 35 U.S.C. § 119 to Korean Patent Application No. 10-2021-0157875, which was filed in the Korean Intellectual Property Office on Nov. 16, 2021, the entire disclosure of which is incorporated herein by reference.

BACKGROUND

1. Field

The disclosure relates generally to a method and apparatus for a terminal authentication for remote provisioning in a wireless system and, more particularly, to a method for authenticating a terminal performing a user plane (UP) based remote provisioning in onboarding.

2. Description of Related Art

5th generation (5G) mobile communication technologies define broad frequency bands such that high transmission rates and new services are possible, and can be implemented not only in sub 6 GHz bands such as 3.5 GHz, but also in above 6 GHz bands referred to as mmWave including 28 GHz and 39 GHz. In addition, it has been considered to implement 6th generation (6G) mobile communication technologies (referred to as beyond 5G systems) in terahertz bands (e.g., 95 GHz to 3 THz bands) in order to accomplish transmission rates up to fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC) and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multibeam transmission and broadbands, definition and operation of bandwidth part (MVP), new channel coding methods such as a low density parity check (LDPC) code for large amount of data transmission and a polar code for highly reliable transmission of control information. L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Accordingly, it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Further, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Various services can be provided according to the development of mobile communication systems, as described above. However, a method for efficiently using a non-public network (NPN) is required.

SUMMARY

The disclosure has been made to address at least the above-mentioned problems and/or disadvantages and to provide at least the advantages described below.

An aspect of the disclosure is to provide a method and apparatus capable of effectively providing a service in a wireless communication system.

According to the disclosure, when a terminal performs UP-based remote provisioning to receive standalone NPN (SNPN) credentials and user subscription data, a provisioning server (PVS) providing; the SNPN credentials and the user subscription data performs an authentication procedure on the terminal. A method for authenticating a terminal by the PVS server is provided below.

In accordance with aspect of the disclosure, a method for operating a terminal in a wireless network is provided that includes configuring a restricted packet data unit (PDU) session with a PVS; transmitting a remote provisioning request message including a subscription permanent identifier (SUPI) to the PVS; and receiving a remote provisioning response message in response to the remote provisioning request message. The remote provisioning response message includes SNPN credentials and subscription data of a terminal in case that a remote provisioning for the terminal is approved.

In accordance with another aspect of the disclosure, a method for operating a PVS in a wireless network is provided that includes configuring a restricted PDU session with a terminal; receiving a remote provisioning request message including a SUPI from the terminal; and transmitting a remote provisioning response message to the terminal in response to the remote provisioning request message. The remote provisioning response message includes SNPN credentials and subscription data of the terminal in case that a remote provisioning for the terminal is approved.

In accordance with another aspect of the disclosure, a method for operating a default credentials server (DCS) in a wireless network is provided that includes performing mutual authentication with a PVS; receiving an authentication request message including a SUPI from the PVS; and transmitting an authentication response message including an authentication result to the PVS in response to the authentication request message. The authentication request message is transmitted based on a remote provisioning request message received from the terminal. The authentication response message includes SNPN credentials and subscription data of the terminal in case that the authentication result indicates authentication success.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Hereinafter, embodiments are described in detail with reference to the accompanying drawings. In the drawings, the same reference numerals denote the same elements. Well known functions or structures may not be described or illustrated in detail to avoid obscuring the subject matter of the disclosure.

In the accompanying drawings, some components may be exaggerated, omitted, or schematically illustrated. Further, the size of each component does not entirely reflect the actual size. In the drawings, identical or corresponding components may be provided with identical or similar reference numerals.

Various advantages and features of the disclosure and ways to achieve them will be apparent by making reference to embodiments as described below, in conjunction with the accompanying drawings. However, the disclosure is not limited to the embodiments set forth below, but may be implemented in various different forms. The following embodiments are provided only to inform those skilled in the art the scope of the disclosure, with the present disclosure being defined by the appended claims.

Each block of the flowchart illustrations, and combinations of blocks in the flowchart illustrations, can be implemented by computer program instructions, which may be mounted on a processor of a general purpose computer, a special purpose computer or other programmable data processing apparatus so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Further, each block may represent a portion of a module, a segment or code, which includes one or more executable instructions for implementing a specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

The term unit means software or a hardware component, such as a field programmable gate array (FPGA) or an application-specific integrated circuit (ASIC), and the unit performs specific tasks. However, the unit does not always have a meaning limited to software or hardware. The unit may advantageously be configured to reside on an addressable storage medium and configured to operate on one or more processors. Accordingly, the unit may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and units may be combined into fewer components and units or may be further separated into additional components and units. Further, the components and units may be implemented to operate on one or more central processing units (CPUs) within a device or a security multimedia card.

Herein, a base station is an entity that performs resource allocation of the terminal, and may be at least one of a Node B, an epode B (eNB), a gNode B (gNB), a wireless access unit, a base station controller (BSC), or a node on a network. A terminal may include a UE, a mobile station (MS), a cellular phone, a smartphone, a computer, or a multimedia system capable of performing communication functions. In addition, embodiments may be applied to other, similar, communication systems.

As used herein, a term for identifying an access node, terms referring to network entities or network functions (NFs), terms referring to messages, a term referring to an interface between network objects, and terms referring to various identification information are illustrated for convenience of explanation. Therefore, the disclosure is not limited by the following terms, and other terms indicating targets having equivalent technical meanings may be used.

For convenience of a description, the disclosure may employ terms and names defined in the 3rd-Generation Partnership Project Long Term Evolution (3GPP LTE) standards, However, the disclosure is not limited by such terms and names, and may be equally applied to systems complying with other standards.

Figure 1:
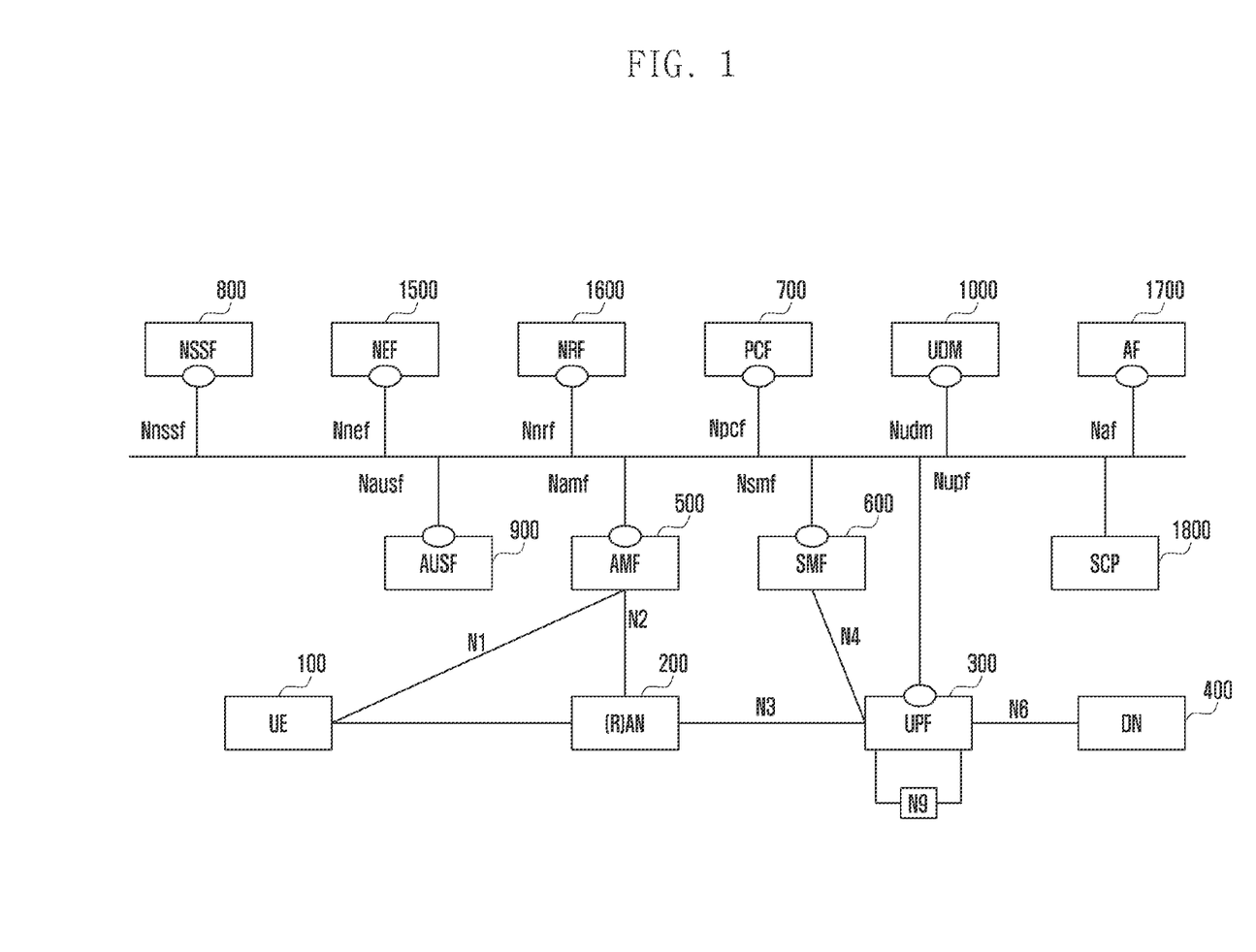
FIG. 1 illustrates a 5G network according to an embodiment.

FIG. 1 illustrates a 5G network according to an embodiment.

With reference to FIG. 1, a network entity or network nodes constituting a 5G network 10 will be described as below An access network (AN), e.g., a radio AN ((R)AN) 200 performs radio resource allocation of a terminal (UE) 100, and may be at least one of an eNode B, a Node B, a BS, a next generation RAN (NG-RAN), a 5G-AN, a wireless access unit, a BSC, or a node on a network. The UE 100 may include UE, a next generation UE (NG UE), an MS, a cellular phone, a smartphone, a computer, or a multimedia system capable of performing communication functions. While embodiments are described by using a 5G system as an example, the embodiments may also be applied to similar communication systems.

As a wireless communication system evolves from a 4G system to a 5G system, a NextGen (NG) core or a 5G core (5GC) network, which is a new core network, will be defined. The new core network virtualizes all existing network entities (NEs) to form an NF, which may mean a network entity, a network component, and a network resource.

A 5GC may include NFs (300, 400, 500, 600, 700, 800, 900, 1000, 1500, 1600, 1700, and 1800) illustrated in FIG. 1. The 5GC is not limited to the illustration of FIG. 1, and may also include fewer or a greater of NFs than illustrated in FIG. 1.

An access and mobility management function (AMF) 500 may be an NF that manages mobility of the UE 100.

A session management function (SMF) 600 may be an NF that manages packet data network (PDN) connection provided to the UE 100. The PDN connection may be referred to as a PDU session.

A policy control function (PCF) 700 may be an NF that applies a service policy, a charging policy, and a PDU session policy of a mobile network operator for the UE 100.

A unified data management (UDM) 1000 provides an NF that stores information for a subscriber.

A network exposure function (NEF) 1500 provides information about the UE 100 to a server outside a 5G network. In addition, the NEF 1500 may provide information required for a service to the 5G network to store the information in a unified data repository (UDR, not shown).

A UP function (UPF) 300 serves as a gateway that delivers a user data (e.g., a PDU) to a data network (DN) 400.

A network repository function (NRF) 1600 functions to discover an NE.

An authentication server function (AUSF) 900 performs authentication with respect to a terminal on a 3GPP AN and a non-3GPP AN.

A network slice selection function (NSSF) 800 performs a function of selecting a network slice instance provided to the terminal 100.

The UE 100 transmits or receives data through the DN 400 in order to use a service of a network operator or a service of a 3rd party.

Figure 2:
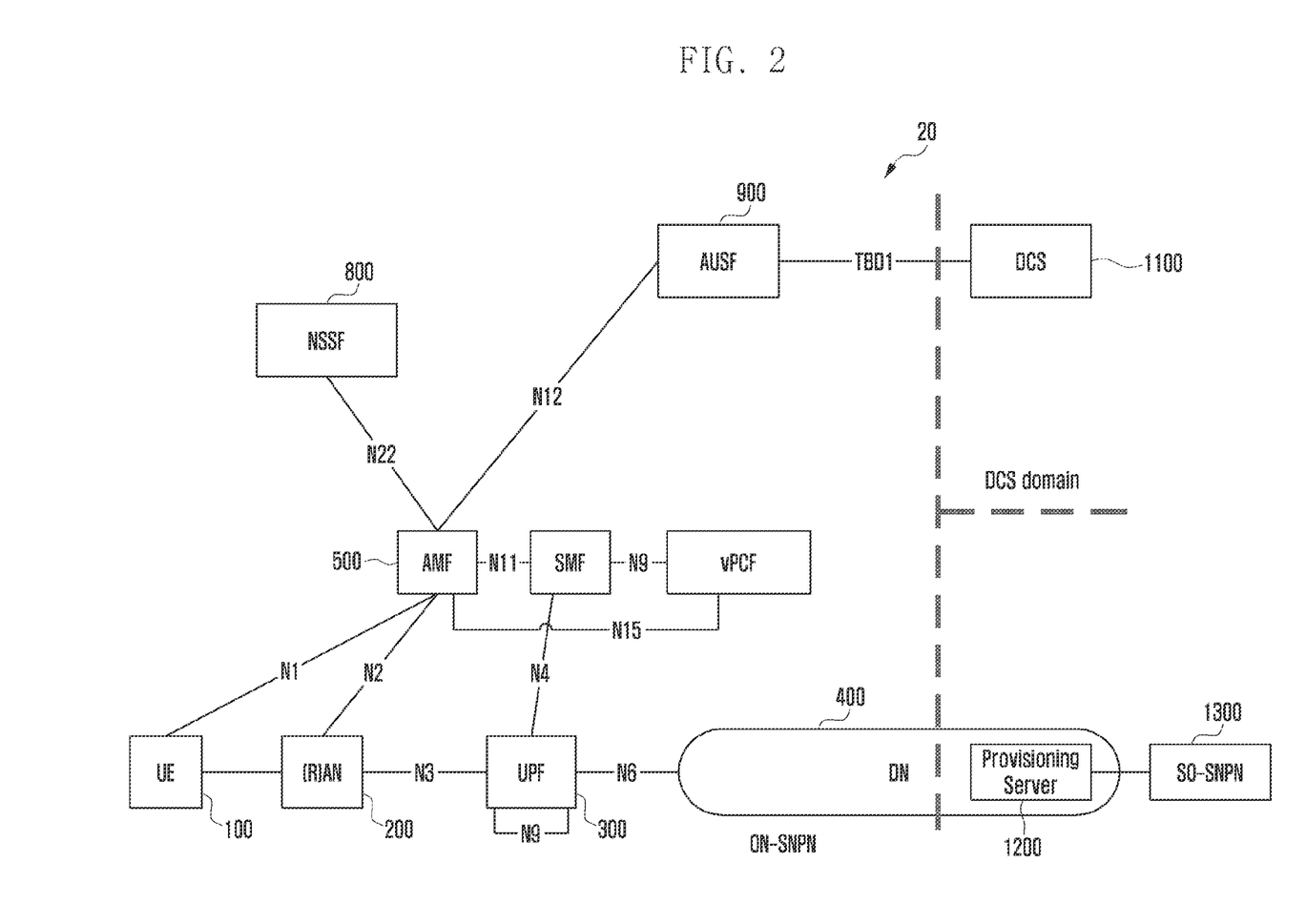
FIG. 2 illustrates a structure of a 5G network according to an embodiment.

FIG. 2 illustrates a structure of a 5G network according to an embodiment.

Regarding an UP-based UE onboarding, FIG. 2 provides a conceptual diagram illustrating remote provisioning based on a control plane. In FIG. 2, the wireless communication system 20 for transmitting SNPN credentials and user subscriber data for accessing the SNPN to the UE 100 may include the UE 100, an onboarding SNPN (ON-SNPN) 400, a DCS 1100, PVS 1200, and a subscription owner SNPN (SO-SNPN) 1300 that includes SNPN credentials and user subscription data.

Here, it is assumed that the UE 100 does not have the SNPN credentials and user subscription data, and the UE 100 has a default UE credentials allocated by the DCS 1100. In addition, the DCS 1100 may allocate an SUPI capable of uniquely identifying the UE 100 to the UE 100.

The ON-SNPN 400 may provide the UE 100 with an UP-based IP connectivity (UE onboarding) or a CP-based non-access stratum (NAS) connectivity (UE onboarding) so that the UE, which does not have SNPN credentials and user subscription data, may receive the SNPN credentials and user subscription data. In order to determine whether to provide the UE onboarding service to the UE 100, the ON-SNPN may request authentication and authorization for the UE 100 from the DCS 1100.

The DCS 1100 may configure default UE credentials and a SUPI for the UE 100 in advance, and then store the configured default UE credentials and the SUPI. The DCS 1100 may receive a request for authentication for the UE 100 from the ON-SNPN when performing registration for UE onboarding. Here, authentication and authorization for the UE 100 is performed based on the default UE credentials and the SUPI.

In addition, when the PVS 1200 transmits the SNPN credentials and user subscription data to the UE 100, the DCS 1100 may receive a request for terminal authentication for the UE 100 from the PVS 1200 to determine whether the UE 100 is a terminal having the right to receive the SNPN credentials and user subscription data. The DCS 1100 may be a manufacturer of the UE 100 or a third party associated with the manufacturer or the SNPN network operator.

The PVS 1200 may receive a SNPN credentials and user subscription data such as user configuration information from the SO-SNPN 1300 and transmit the received SNPN credentials and the user subscription data to the UE.

The PVS 1200 may exist as a single server with the DCS 1100, and like the DCS 1100, the PVS 1200 may be a server owned by the manufacturer of the UE 100 or a third party associated with the SNPN network operator. The PVS 1200 may communicate with the DCS 1100 for authentication and authorization of the UE 100.

The SO-SNPN 1300 including the SNPN credentials and user subscription data may transmit the SNPN credentials and user subscription data to the UE 100 through the PVS 1200.

Figure 3:
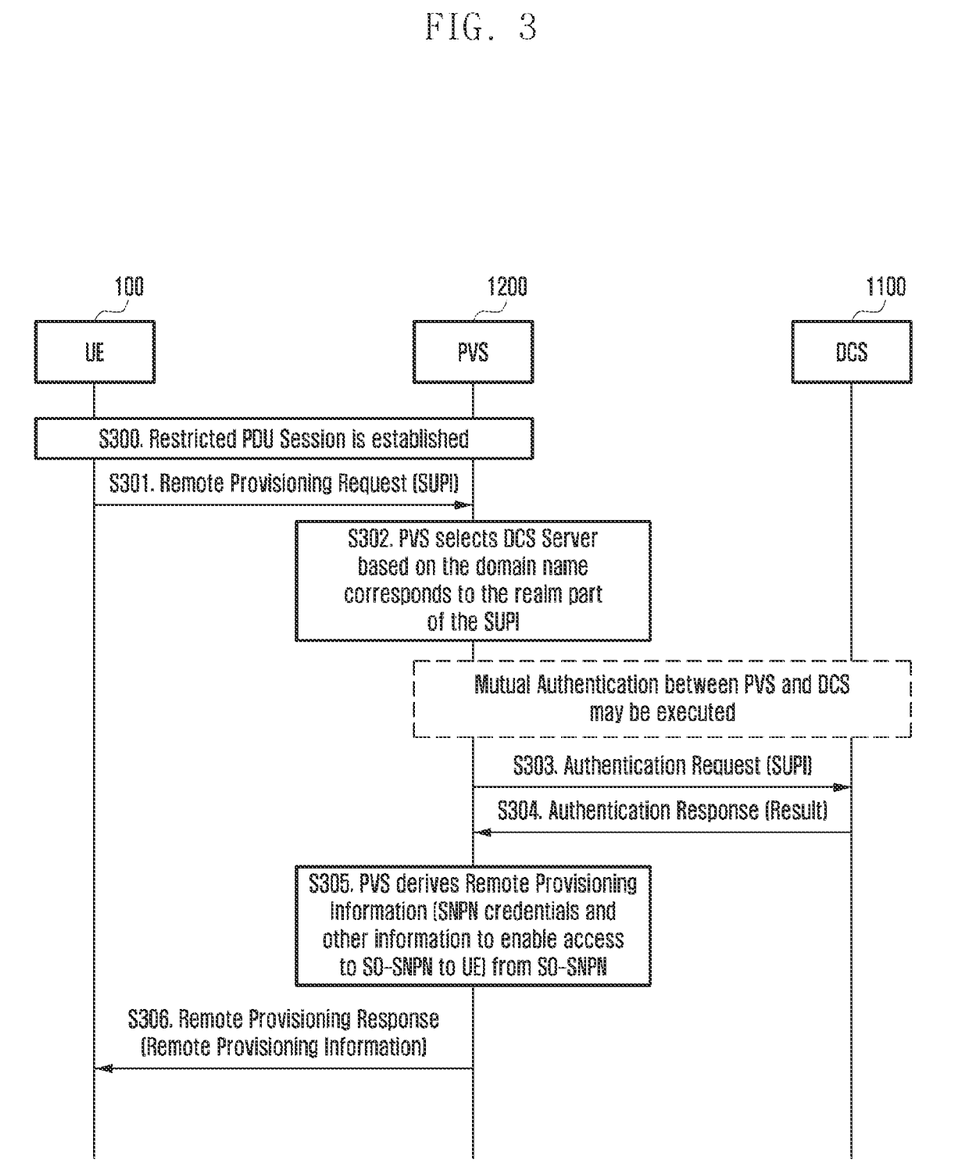
FIG. 3 is a signal flow diagram of a procedure for performing registration for onboarding after generating a restricted PDU session in order to receive SNPN credentials and user subscription data from a PVS according to an embodiment.

FIG. 3 is a signal flow diagram of a procedure for performing registration for onboarding after generating a restricted PDU session in order to receive SNPN credentials and user subscription data from the PVS 1200 according to an embodiment.

Referring to FIG. 3, in step S300, the UE 100 generates a restricted PDU session in the ON-SNPN network in order to perform UP-based remote provisioning. The restricted PDU session refers to a PDU session for remote provisioning that only allows traffic to the PVS 1200 and a domain name system (DNS) server and does not allow traffic destined for other destinations.

In step S301, the UE 100 transmits a remote provisioning request message including an SUPI to the PVS 1200. The Internet protocol (IP) address or fully qualified domain name (FQDN) address of the PVS 1200 may be preconfigured in the UE 100 or may be received from the ON-SNPN to the UE 100. The PVS 1200 may receive a remote provisioning message including the SUPI from the UE 100.

In step 5302, the PVS 1200 selects the DCS server based on the SUPI. The PVS 1200 may identify and address the DCS server based on the SUPI. For example, the SUPI of the UE 100 is in the form of a network access identifier (NAI), so that the DCS server can be identified and addressed using a realm part of the SUPI.

Mutual authentication between the PVS 1200 and the DCS 1100 may be performed.

In step S303, the PVS 1200 may transmit an authentication request message including the SUPI of the UE 100 to the DCS 1100 for authentication of the UE 100. The DCS 1100 may receive the authentication request message including the SUPI of the UE 100 from the PVS 1200.

In step S304, the DCS 1100 may transmit an authentication response message including a terminal authentication result to the PVS 1200 in response to the authentication request message. The PVS 1200 may receive the authentication response message including the terminal authentication result in response to the authentication request message from the DCS 1100.

In step S305, the PVS 1200 may determine a remote provisioning based on the terminal authentication result. The terminal authentication result may indicate authentication success or authentication failure. In case that the terminal authentication result indicates authentication success, the PVS 1200 may receive the SNPN credentials and subscription data of the UE 100 from the SO-SNPN. In case that the terminal authentication result indicates authentication failure, the remote provisioning request of the UE 100 may be rejected.

In step S306, the PVS 1200 transmits a remote provisioning response message including the SNPN credentials and subscription data of the UE 100 received from the SO-SNPN 20 to the UE 100. In step S305, in case that the PVS 1200 receives the terminal authentication result indicating a terminal authentication failure from the DCS 1100, the PVS 1200 may transmit a remote provisioning response message including the terminal authentication result indicating the terminal authentication failure to the UE. The UE 100 may receive the remote provisioning response message from the PAS 1200. In case that the remote provisioning of the UE 100 is approved, the remote provisioning response message may include the SNPN credentials and subscription data of the UE 100. In case that the remote provisioning of the UE 100 is not approved, the remote provisioning response message may include the terminal authentication result indicating a terminal authentication failure.

Figure 4:
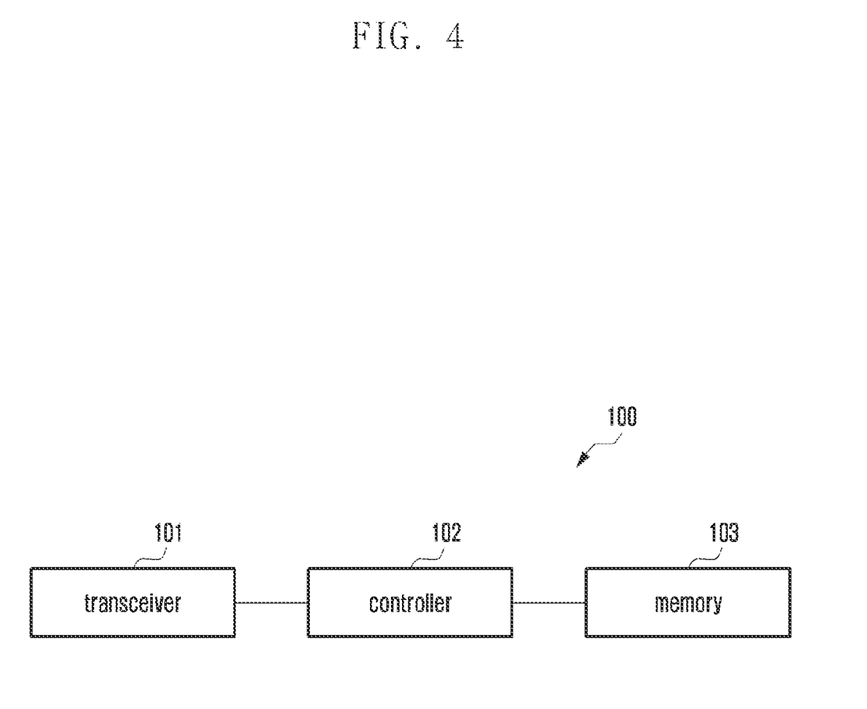
FIG. 4 illustrates a terminal according to an embodiment.

FIG. 4 illustrates a terminal (UE 100) according to an embodiment.

Referring to FIG. 4, the UE 100 includes a processor 102 configured to control overall operations of the UE 100, a transceiver 101 including a transmitter and a receiver, and a memory 103. However, the terminal is not limited to the above example, and may include a greater number of or fewer components than those illustrated in FIG. 4.

The transceiver 101 may transmit or receive a signal to or from network entities (200, 300, 400, 500, 600, 700, 800, 900, 1000, 1100, 1200, 1400, 1500, 1600, 1700) or other terminals. A signal transmitted to or from a network entity (200, 300, 400, 500, 600, 700, 800, 900, 1000, 1100, 1200, 1400, 1500, 1600, 1700) may include control information and data. In addition, the transceiver 101 may receive a signal via a radio channel and output the same to the controller 102, and transmit the signal output from the controller 102, via the radio channel.

The controller 102 may control the UE 100 such that the terminal performs the above-described operations of FIGS. 3 and 4. The controller 102, the memory 103, and the transceiver 101 are not necessarily implemented as separate modules but may also be implemented as a single component, for example, in the form of a single chip. Also, the controller 102 and the transceiver 101 may be electrically connected to each other. Also, the controller 102 may be an application processor (AP), a communicator processor (CP), a circuit, an application-specific circuit, or at least one processor.

The memory 103 may store data such as a basic program for operation of the UE 100, an application program, setup information, etc. In particular, the memory 103 provides stored data according to a request from the controller 102. The memory 103 may be constituted in a storage medium, such as read-only memory (ROM), random access memory (RAM), a hard disk, compact disc-ROM (CD-ROM), or a digital versatile disc (DVD), or a combination thereof. The memory 103 may be included by a plural number. Also, the controller 102 may execute the above-described embodiments based on a program stored in the memory 103, the program being designed to perform the above-described embodiments of the disclosure.

Figure 5:
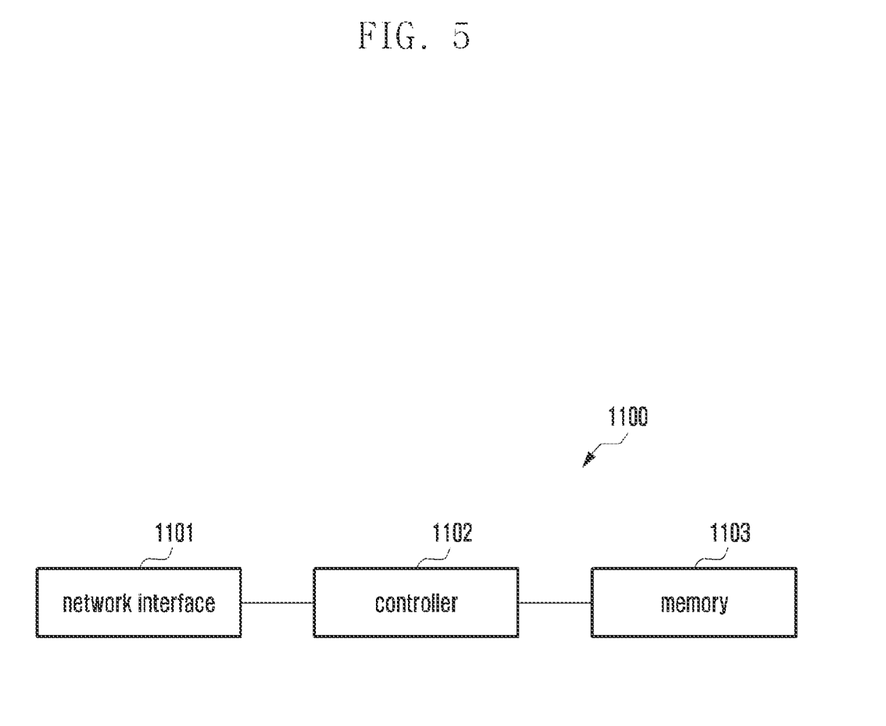
FIG. 5 illustrates a DCS according to an embodiment.

FIG. 5 illustrates a DCS 1100 according to an embodiment.

Referring to FIG. 5, the DCS 1100 includes a controller 1102 configured to control overall operations of the DCS 1100, a network interface 1101 including a transmitter and a receiver, and a memory 1103. However, the DCS 1100 is not limited to the above example, and may include a greater number of or fewer components than those illustrated in FIG. 5.

The network interface 1101 may transmit or receive a signal to or from other network entities (200, 300, 400, 500, 600, 700, 800, 900, 1000, 1100, 1200, 1400, 1500, 1600, 1700) or at least one of terminals 100. The signal transmitted or received to or from the other network entities (200, 300, 400, 500, 600, 700, 800, 900, 1000, 1100, 1200, 1400, 1500, 1600, 1700) or at least one of the terminals 100 may include control information and data.

The controller 1102 may control the DCS 1100 such that the DCS 1100 performs the above-described operations of FIG. 3. Meanwhile, the controller 1102, the memory 1103, and the network interface 1101 are not necessarily implemented as separate modules but may also be implemented as a single component, for example, in the form of a single chip. Also, the controller 1102 and the network interface 1101 may be electrically connected to each other. Also, the controller 1102 may be an AP, a CP, a circuit, an application-specific circuit, or at least one processor.

The memory 1103 may store data such as a basic program for operation of the DCS 1100, an application program, configuration information, or the like. In particular, the memory 1103 provides stored data according to a request from the controller 1102. The memory 1103 may be configured in a storage medium, such as ROM, RAM, a hard disk, CD-ROM, or DVD, or a combination thereof. The memory 1103 may be included by a plural number. Also, the controller 1102 may execute the above-described embodiments based on a program stored in the memory 1103, the program being designed to perform the above-described embodiments of the disclosure.

Figure 6:
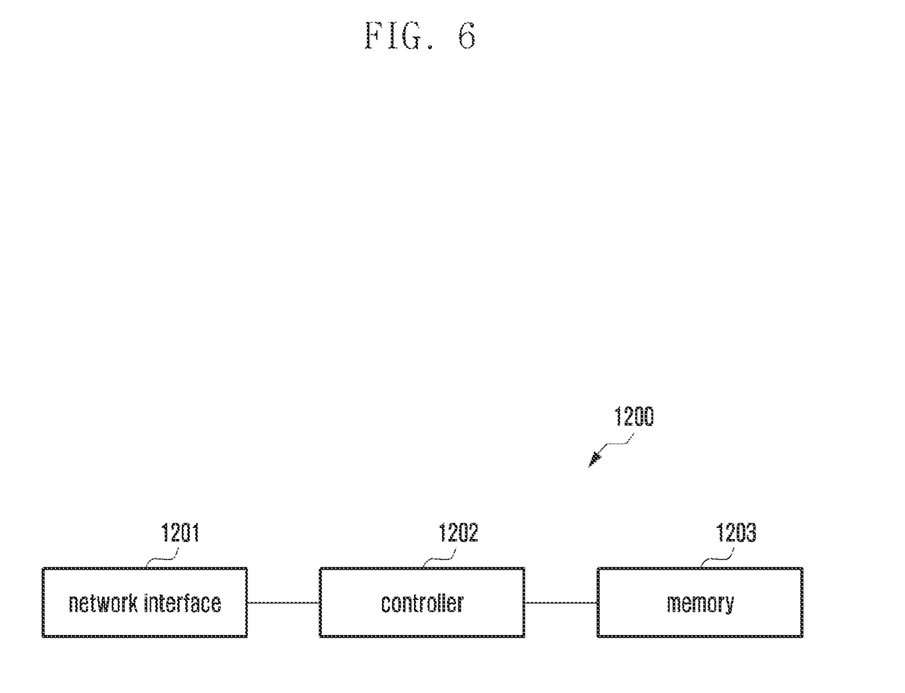
FIG. 6 illustrates a PVS according to an embodiment.

FIG. 6 illustrates a PVS 1200 according to an embodiment.

Referring to FIG. 6, the PVS 1200 includes a controller 1202 configured to control overall operations of the PVS 1200, a transceiver 1201 including a transmitter and a receiver, and a memory 1203. However, the PVS 1200 is not limited to the above example, and may include a greater number of or fewer components than those illustrated in FIG. 6.

The transceiver 1201 may transmit or receive a signal to or from other network entities (200, 300, 400, 500, 600, 700, 800, 900, 1000, 1100, 1200, 1400, 1500, 1600, 1700) or at least one of terminals 100. The signal transmitted or received to or from the other network entities (200, 300, 400, 500, 600, 700, 800, 900, 1000, 1100, 1200, 1400, 1500, 1600, 1700) or at least one of the terminals 100 may include control information and data.

The controller 1202 may control the PVS 1200 such that the PVS 1200 performs the above-described operations of FIG. 3. The controller 1202, the memory 1203, and the transceiver 1201 are not necessarily implemented as separate modules but may also be implemented as a single component, for example, in the form of a single chip. Also, the controller 1202 and the transceiver 1201 may be electrically connected to each other. Also, the controller 1202 may be an AP, a CP, a circuit, an application-specific circuit, or at least one processor.

The memory 1203 may store data such as a basic program for operation of the PVS 1200, an application program, configuration information, etc. In particular, the memory 1203 provides stored data according to a request from the controller 1202. The memory 1203 may be configured in a storage medium, such as ROM, RAM, a hard disk, CD-ROM, or DVD, or a combination thereof. The memory 1203 may be included by a plural number. Also, the controller 1202 may execute the above-described embodiments based on a program stored in the memory 1203, the program being designed to perform the above-described embodiments of the disclosure.

The above-described structural diagram, an exemplary diagram of a method of transmitting a control/data signal, an exemplary diagram of an operation procedure, and structural diagrams are not intended to limit the scope of the disclosure. That is, all components, entities, or steps of operation described in the embodiments of the disclosure should not be interpreted as being essential components for the implementation of the disclosure, and the disclosure may be implemented within the scope that does not impair the essence of the disclosure, by including only some components. Also, the respective embodiments may be combined with each other as required and operated. For example, portions of the methods according to the disclosure may be combined with each other to enable a network entity and a terminal to operate.

The operations of the base station or the terminal described above may be implemented by including a memory device storing relevant program codes, in an arbitrary component in the base station or the terminal device. That is, a controller of the base station or the terminal device may execute the above-described operations by reading the program codes stored in the memory device by using a processor or a CPU and execute the same.

Various components and modules of an entity, a base station, or a terminal device described herein may also be operated using a hardware circuit, for example, a complementary metal oxide semiconductor-based logic circuit, firmware, or a combination of software and/or hardware or a combination of firmware and/or software embedded in a machine-readable medium. As an example, various electrical structures and methods may be implemented using transistors, logic gates, and electrical circuits such as application-specific semiconductors.

In the case that components are implemented as software, a computer-readable storage medium storing one or more programs (e.g., software modules) may be provided. The one or more programs stored in the computer-readable storage medium are configured to be executable by one or more processors in an electronic device. The one or more programs include instructions causing the electronic device to execute the methods according to embodiments.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory including a combination of some or all of the above-mentioned memory devices. In addition, each memory may be included by a plural number.

In addition, the programs may also be stored in an attachable storage device which is accessible through a communication network such as the Internet, an intranet, a local area network (LAN), a wireless LAN (WLAN), a storage area network (SAN), or a combination thereof. The storage device may be connected through an external port to an apparatus performing the embodiments of the disclosure. Also, a separate storage device on the communication network may also be connected to the apparatus performing the embodiments of the disclosure.

In the above-described particular embodiments of the disclosure, components included in the disclosure are expressed in a singular or plural form according to the particular embodiments of the disclosure. However, the singular or plural form is appropriately selected for convenience of explanation and the disclosure is not limited thereto. As such, a component expressed in a plural form may also be constituted as a single component, and a component expressed in a singular form may also be configured as plural components.

Although specific embodiments have been described in the detailed description of the disclosure, various modifications are possible without departing from the scope of the disclosure. Therefore, the scope of the disclosure should not be limited to the described embodiments and should be determined by the claims described below as well as the claims and equivalents. That is, it is obvious to those skilled in the art that other modifications based on the technical spirit of the disclosure can be implemented. Also, the respective embodiments may be combined with each other as required and operated. For example, portions of the methods proposed in the disclosure may be combined with each other to enable a base station and a terminal to operate. Although the embodiments have been described based on 5G and the NR system, modified examples based on the technical spirit of the embodiments may also be carried out in other systems such as LTE, LTE-A, LTE-A-Pro systems, etc.

The disclosure may be applied to intelligent services based on the 5G communication technology and the IoT-related technology (for example, smart home, smart building, smart city, smart car, connected car, health care, digital education, smart retail, security and safety services).

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method for operating a terminal in a wireless network, the method comprising:
    configuring a restricted packet data unit (PDU) session with a provisioning server (PVS);
    transmitting a remote provisioning request message including a subscription permanent identifier (SUPI) to the PVS; and
    receiving a remote provisioning response message in response to the remote provisioning request message,
    wherein the remote provisioning response message includes standalone non-public network (SNPN) credentials and subscription data of a terminal in case that remote provisioning for the terminal is approved,
    wherein the remote provisioning response message is determined based on an authentication response message received from a default credentials server (DCS),
    wherein the DCS is selected by the PVS based on the SUPI,
    wherein an authentication request message is transmitted after mutual authentication between the PVS and the DCS is performed, and
    wherein the authentication response message is transmitted in response to the authentication request message transmitted from the PVS to the DCS based on the SUPI.

2. The method of claim 1, wherein the DCS is selected by the PVS based on a realm part of the SUPI.

3. The method of claim 1, wherein the remote provisioning response message includes a terminal authentication result indicating authentication failure for the terminal in case that the remote provisioning for the terminal is not approved.

4. A method for operating a provisioning server (PVS) in a wireless network, the method comprising:
    configuring a restricted packet data unit (PDU) session with a terminal;
    receiving a remote provisioning request message including a subscription permanent identifier (SUPI) from the terminal;
    selecting a default credentials server (DCS), based on the SUPI;
    performing mutual authentication with the DCS;
    transmitting an authentication request message to the DCS including the SUPI after performing the mutual authentication;
    receiving an authentication response message including a terminal authentication result from the DCS;
    transmitting a remote provisioning response message to the terminal in response to the remote provisioning request message,
    wherein the remote provisioning response message includes standalone non-public network (SNPN) credentials and subscription data of the terminal in case that remote provisioning for the terminal is approved, and
    wherein the remote provisioning response message is determined based on the authentication response message.

5. The method of claim 4, wherein the DCS is selected based on a realm part of the SUPI.

6. The method of claim 4, wherein the remote provisioning response message includes a terminal authentication result indicating authentication failure for the terminal in case that the remote provisioning for the terminal is not approved.

7. A method for operating a default credentials server (DCS) in a wireless network, the method comprising:
    performing mutual authentication with a provisioning server (PVS);
    receiving an authentication request message including a subscription permanent identifier (SUPI) from the PVS; and
    transmitting an authentication response message including an authentication result to the PVS in response to the authentication request message,
    wherein the authentication request message is transmitted based on a remote provisioning request message received from a terminal, and the authentication response message includes standalone non-public network (SNPN) credentials and subscription data of the terminal in case that the authentication result indicates authentication success, and
    wherein the mutual authentication is performed after the PVS selects the DCS based on a realm part of the SUPI.

8. The method of claim 7, wherein a remote provisioning response message received in response to the remote provisioning request message includes a terminal authentication result indicating authentication failure for the terminal in case that remote provisioning for the terminal is not approved.

* * * * *